(12) United States Patent
Carns

(10) Patent No.: US 7,878,181 B2
(45) Date of Patent: Feb. 1, 2011

(54) FUEL DELIVERY MODULE REGULATOR VALVE

(75) Inventor: Christopher A. Carns, Hickville, OH (US)

(73) Assignee: Illinois Tool Works Inc., Glenview, IL (US)

( * ) Notice: Subject to any disclaimer, the term of this patent is extended or adjusted under 35 U.S.C. 154(b) by 273 days.

(21) Appl. No.: 12/141,520

(22) Filed: Jun. 18, 2008

(65) Prior Publication Data

US 2009/0235995 A1   Sep. 24, 2009

Related U.S. Application Data

(60) Provisional application No. 60/962,678, filed on Jul. 31, 2007.

(51) Int. Cl.
*F02M 37/04* (2006.01)
*F02M 37/10* (2006.01)

(52) U.S. Cl. .................................. 123/506; 123/457

(58) Field of Classification Search ................. 123/457, 123/459, 506, 510, 514; 137/115.13, 539
See application file for complete search history.

(56) References Cited

U.S. PATENT DOCUMENTS

| 3,970,063 | A | * | 7/1976 | Mayr et al. ................. 123/455 |
| 4,044,746 | A | | 8/1977 | Kaye |
| 4,284,039 | A | * | 8/1981 | Bellicardi et al. ........... 123/463 |
| 5,044,344 | A | | 9/1991 | Tuckey |
| 5,613,476 | A | | 3/1997 | Oi et al. |
| 5,655,504 | A | | 8/1997 | Iwai et al. |
| 5,692,479 | A | | 12/1997 | Ford et al. |
| 5,785,080 | A | * | 7/1998 | Herbst ........................ 137/510 |
| 5,791,317 | A | | 8/1998 | Eck |
| 6,772,738 | B2 | * | 8/2004 | Rembold et al. ............ 123/514 |
| 2003/0041842 | A1 | | 3/2003 | Kumagai et al. |
| 2003/0196702 | A1 | | 10/2003 | Bueser et al. |
| 2004/0177884 | A1 | | 9/2004 | Konishi |

FOREIGN PATENT DOCUMENTS

| DE | 4431996 | 3/1995 |
| DE | 10107223 | 8/2002 |
| EP | 0423636 | 4/1991 |
| EP | 0678664 | 10/1995 |
| EP | 0773361 | 5/1997 |
| EP | 0819843 | 1/1998 |

OTHER PUBLICATIONS

International Search Report and Written Opinion for PCT/US2008/068760.

* cited by examiner

*Primary Examiner*—Mahmoud Gimie
(74) *Attorney, Agent, or Firm*—Mark W. Croll; Paul F. Donovan

(57) ABSTRACT

A pressure responsive regulator valve particularly suitable for a vehicle fuel system includes a substantially monolithic T-shaped body having a first bore defining a substantially unrestricted fluid flow path therethrough and a second bore in fluid flow communication with the first bore. A pressure responsive valve is provided in the second bore to open and close a fluid flow path through the second bore.

20 Claims, 3 Drawing Sheets

FUEL DELIVERY MODULE REGULATOR VALVE

CROSS-REFERENCE TO RELATED APPLICATIONS

The present regular application claims the benefits of U.S. Provisional Application Ser. No. 60/962,678; filed Jul. 31, 2007.

FIELD OF THE INVENTION

The present invention relates to flow control and pressure relief valves, and more specifically, to in-line pressure relief valves used in automobile fuel systems to relieve fuel line pressure.

BACKGROUND OF THE INVENTION

It is known in automobile fuel systems to provide a pressure regulating relief valve in the fuel line, with the valve being designed to open at a specified pressure to allow fuel to drain from the fuel line back to the fuel tank. Relief back to the fuel tank is used under several conditions. It is known to use fuel pumps that deliver much higher fuel flow rates to the fuel rail than is required by the engine for combustion, particularly at low speed operation but also even at high speed operation. For example, it is known to use pumps that deliver 50 to 80 liters/minute, and to bleed off some of the fuel flow even while the engine operates. A pressure regulator/relief valve is used to direct the excess fuel flow back to the fuel tank. Another use of a pressure regulator/control valve is when the engine has been turned off, and heat radiating from the engine causes a significant temperature rise in the fuel rail. Under these conditions, the fuel remaining in the fuel rail or in other fuel system components is heated. As the temperature of the fuel rises, pressure in the fuel system also increases. Accordingly, even with the engine turned off, it is known to have the pressure regulator/relief valves open if the pressure increases to a pre-determined level, thereby allowing fuel and vapor to drain back to the fuel tank. Fore example, it is known to have the valves open at approximately 60 psi+/−about 7 psi.

In a known relief valve, an outer plastic cup houses a metal regulator valve that includes two O-rings and a plastic filter. The valve is pressed into a seat area in the plastic cup and is held in place by a metal u-clip. The valve has three tubing connections. Two of the connections are used to install the valve as an in-line component at some location in the fuel delivery path. With the valve closed, fuel flows through the two in-line connections. A third connection communicates with the fuel tank interior. Under the prescribed high pressure condition for which the valve is designed, the valve opens to divert at least some fluid flow through the third connection back to the fuel tank.

Known pressure regulating control valves used for this purpose are relatively complicated, expensive to manufacture and assemble, large and relatively heavy for the environment in which they are used. Control valves of this type are known to be unique to particular applications; and to provide valves of different types for different installations and uses, such as valves operating under different pressure conditions, it has been necessary to stock a large variety of different valves and the parts therefor.

Accordingly, it would be desirable to provide an improved pressure regulating control valve that is simple in operation, small, lighter in weight and easier to assemble and install. It is desirable also to provide a pressure regulating relief valve that can be readily and easily assembled to operate under different pressure conditions so that fewer different valves and/or parts for valves are necessary to assemble valves for operating under different conditions.

SUMMARY OF THE INVENTION

The present invention provides a pressure regulating relief valve that can be installed in line in a vehicle fuel system, for example, and includes a through flow conduit for passing fuel on to the engine, and a diverging conduit for bypassing fuel back to the fuel tank. The diverging conduit includes a pressure responsive valve simple in construction and easily modified for operating under different pressure conditions, to open and close the flow patch from the valve and the line in which it is installed to a fuel tank or other reservoir or supply from which the fluid flow is being controlled.

In one aspect of one form thereof, the present invention provides a pressure regulator and control valve with a T-shaped body having a substantially uninterrupted first bore therethrough from a first end opening thereof to a second end opening thereof and a second bore having an internal inlet in the body in flow communication with the first bore, and having an external outlet opening therefrom. A pressure responsive ball valve is provided in the second bore for opening and closing a fluid flow pathway from the first bore through the second bore.

In another aspect of another form thereof, the present invention provides an in-line pressure regulator control valve with a monolithic body defining a first bore and a second bore. The first bore has first and second outer openings in the body at opposite ends of the first bore and defines a substantially unrestricted fluid flow path through the body. The second bore has an inner end opening into the first bore, between the first and second outer openings, and a second end thereof defining a third outer opening in the body. A pressure responsive valve in the second bore has a closed position blocking flow through the second bore when a pressure of a fluid in the first bore is below a pre-established pressure, and an opened position allowing fluid flow through the second bore when a pressure of a fluid in the first bore is above the pre-established pressure.

In a further aspect of a further form thereof, the present invention provides a vehicle fuel system module with a fuel tank, a fuel pump delivering fuel from the fuel tank, a fuel line from the fuel pump, and an in-line fuel pressure regulator and control valve in flow through installation in the fuel line. The fuel pressure regulator and control valve includes a body defining first and second bores therein. The first bore has an inlet and an outlet connected to the fuel line, and defines a flow through path in direct flow communication with the fuel line. The second bore has an inlet in flow communication with the first bore between the inlet and the outlet of the first bore, and the second bore has an outlet therefrom in flow communication with the fuel tank. A pressure responsive valve in the second bore opens and closes a fluid flow path through the second bore.

An advantage of the present invention, in one form there of is providing a fuel line pressure relief and floe control valve that is simple to assemble and install.

Another advantage of the present invention, in another form there of is providing a fuel line pressure relief and flow control valve that is easy to assemble to be responsive to and operate under different pressure conditions.

Still another advantage of the present invention, in still another form there of is providing a fuel line pressure relief and flow control valve that is simple in operation and reliable in performance.

Other features and advantages of the invention will become apparent to those skilled in the art upon review of the following detailed description, claims and drawings in which like numerals are used to designate like features.

Figure 1:
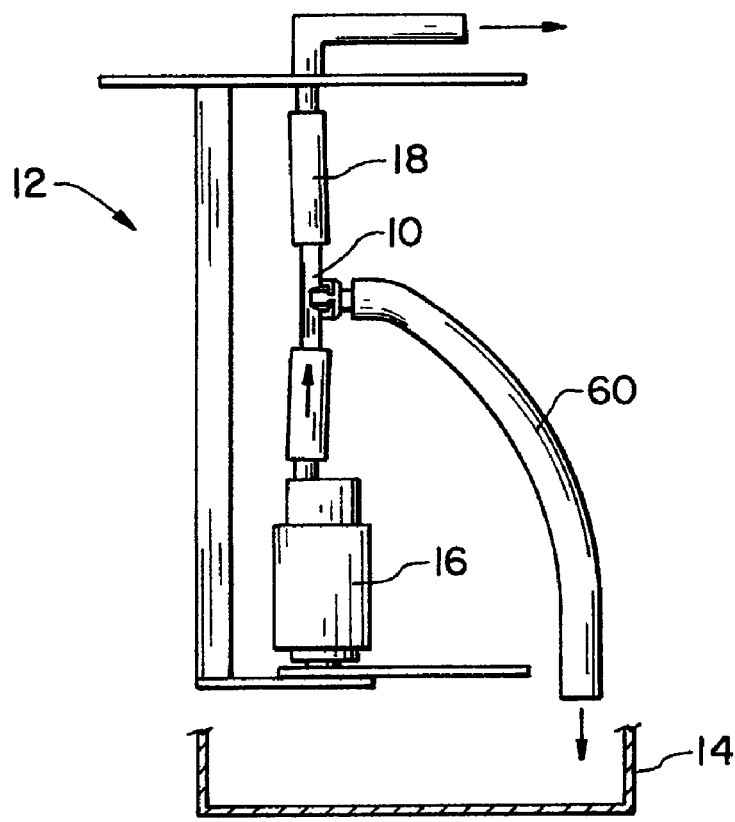
FIG. 1 is an illustration of a vehicle fuel system in which a pressure regulator/control vale of the present invention is used.
Figure 2:
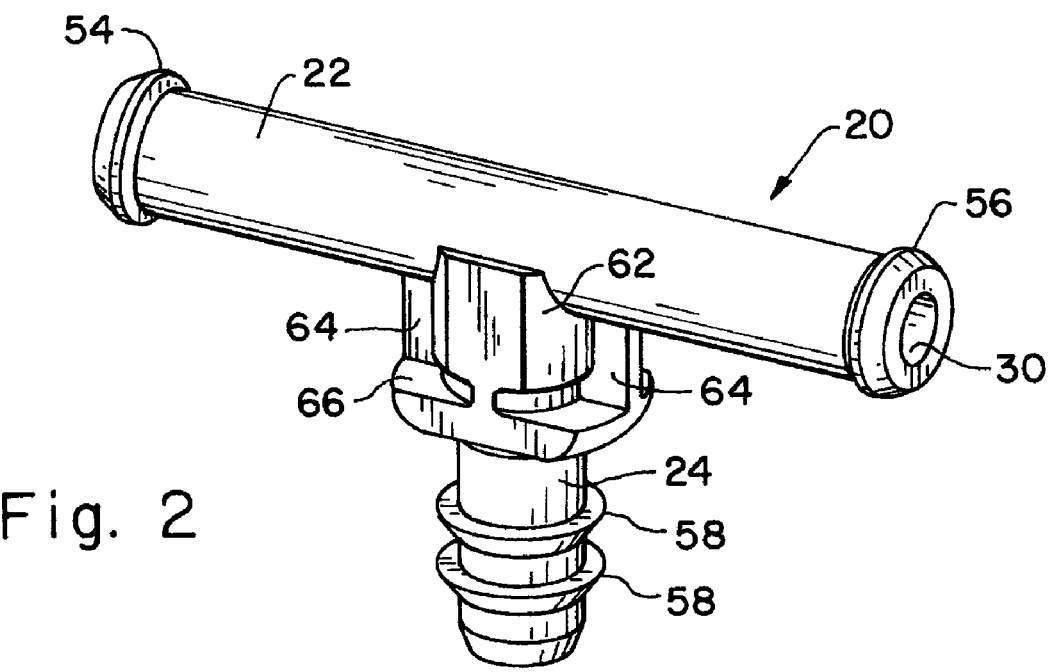
FIG. 2 is a perspective view of a pressure regulator/control valve of the present invention.
Figure 3:
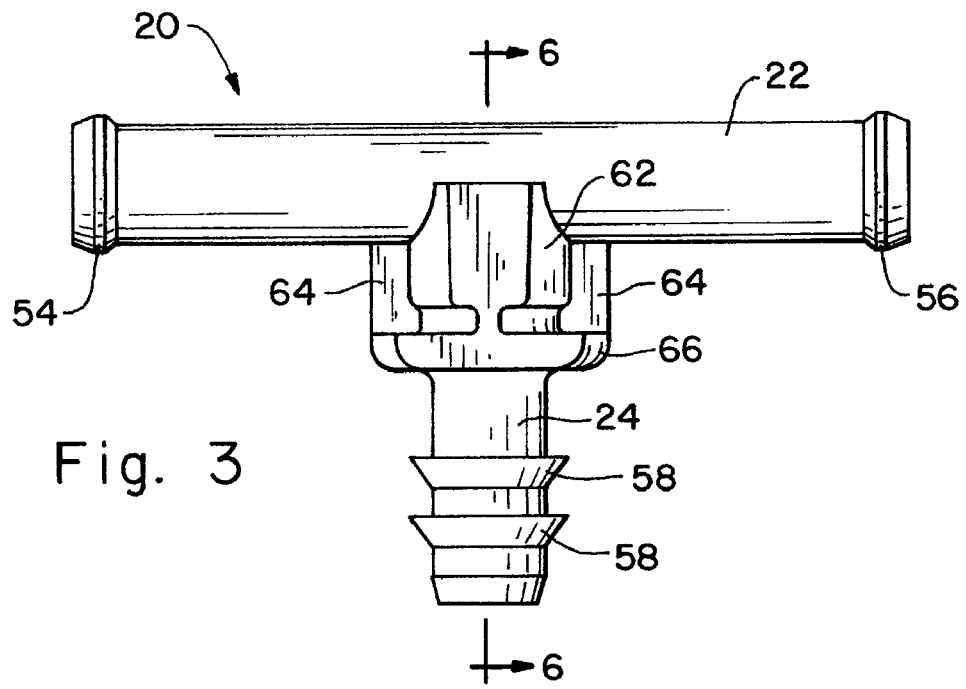
FIG. 3 is an elevational view of a pressure regulator/control valve of the present invention.
Figure 4:
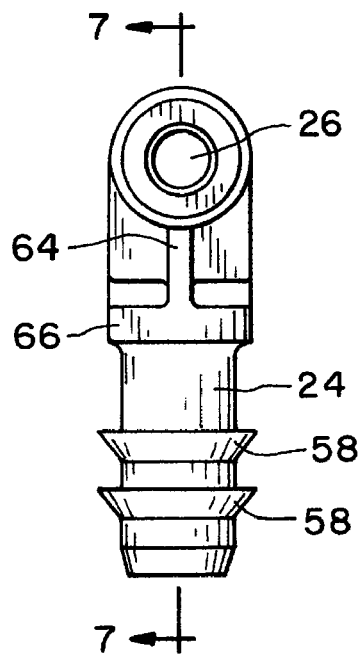
FIG. 4 is an end view of the pressure regulator/control valve shown in the previous drawings.
Figure 6:
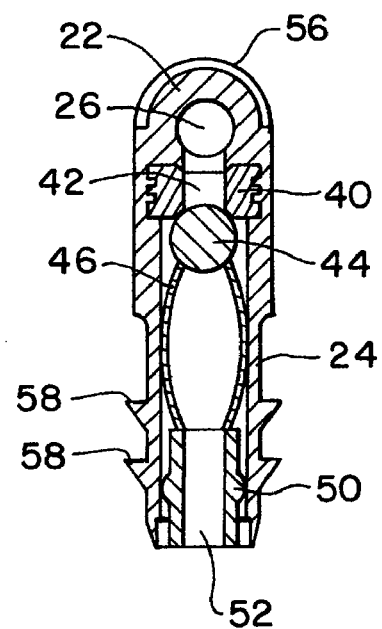
FIG. 6 is a cross-sectional view of the pressure regulator/control valve of the present invention, taken on line 6-6 of FIG. 3.
Figure 5:
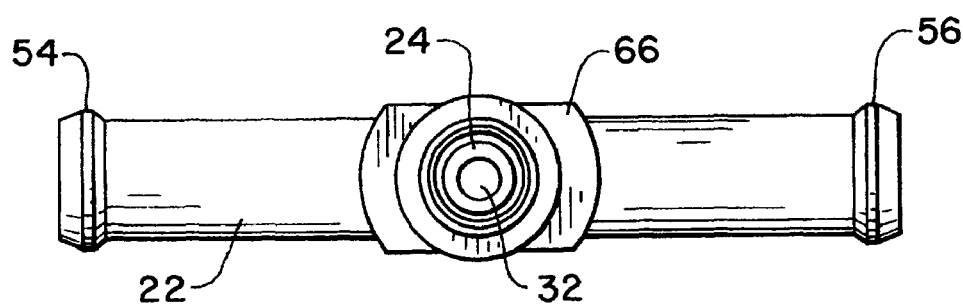
FIG. 5 is a bottom view of the pressure regulator/control valve as shown in FIG. 3.
Figure 7:
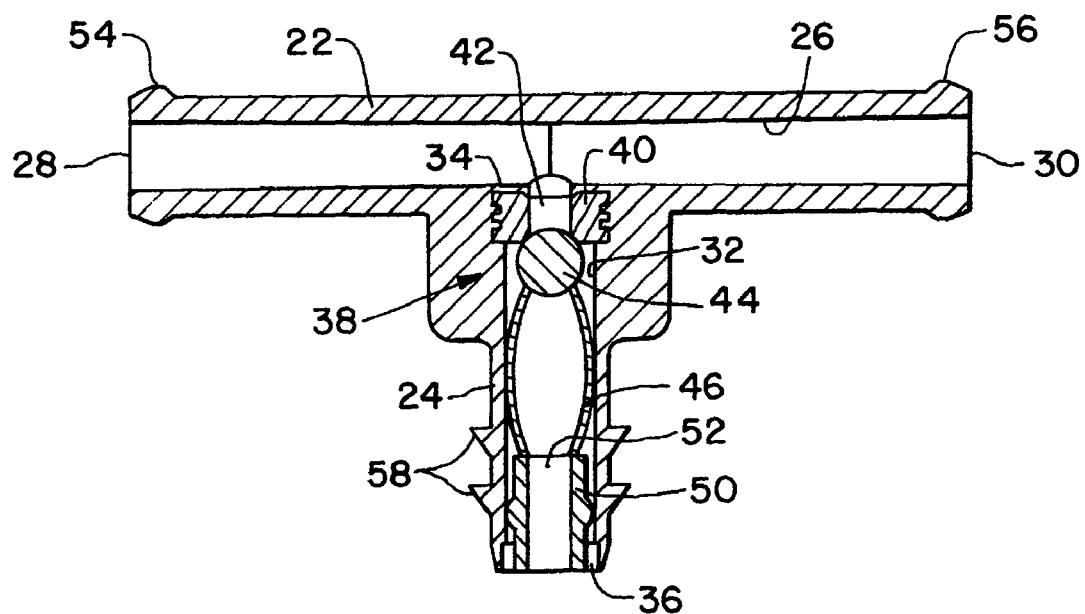
FIG. 7 is a cross-sectional view of the pressure regulator/control valve of the present invention, taken on line 7-7 of FIG. 4.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now to the drawings more specifically and to FIG. 1 in particular, an inline pressure regulator control valve 10 of the present invention is shown provided in a vehicle fuel system module 12 that further includes a fuel tank 14, a fuel pump 16 and a fuel line 18. Regulator control valve 10 is provided in-line within fuel line 18 leading from pump 16 to an engine at which fuel is consumed. Regulator control valve 10 is configured to return a portion of the fuel flowing from pump 16 or provided in fuel line 18 under various operating conditions, such as conditions of excess flow or overpressure which may exist during operation or shutdown of an engine in which fuel system module 12 is provided.

Regulator control valve 10 includes a generally T-shaped monolithic body 20 of injection molded plastic, such as an acetal copolymer, having a first tube-like portion 22 and a second tube like portion 24. First tube-like portion 22 defines a substantially linear first bore 26 having open ends defining an inlet opening 28 and an outlet opening 30. First bore 26 provides a substantially unrestricted fluid flow path through regulator control valve 10 between openings 28 and 30, which are connected for direct fluid flow communication with fuel line 18.

Second tube-like portion 24 defines a second bore 32 provided at an angle to intersect with first bore 26. While the exemplary embodiment shown in the drawings depicts second tube-like portion 24 located substantially at the midpoint of first tube-like portion 22, generally centrally located between inlet opening 28 and outlet opening 30 thereof, and substantially perpendicular thereto, it should be understood that second tube-like portion 24 can be located elsewhere along the length of first tube-like portion 22, and/or at an angle to first tube-like portion 22 other than perpendicular thereto.

Second bore 32 defines an inlet opening 34 at an inner end of the second bore internal in body 20, establishing fluid flow communication with first bore 26. Second bore 32 further defines an external outlet opening 36 at its distal outer end.

Accordingly, monolithic T-shaped body 20 has a three external openings therein, first and second first bore end openings 28 and 30 and second bore outlet opening 36.

A pressure responsive valve 38 is provided in second bore 32 to open and close a fluid flow path through second bore 32. Pressure responsive valve 38 includes a valve seat 40 in second bore 32, near inlet 34 at the intersection of first and second bores 26 and 32. Valve seat 40 can be provided of metal such as brass or the like, and can be fixed in position within second bore 32 by insert molding during molding formation of body 20. Valve seat 40 defines a hole 42 therethrough, providing a path for fluid flow through second bore 32 from first bore 26 to second bore 32 outlet opening 36. A valve element 44, which in the exemplary embodiment is a ball 44, is installed on the outlet side of valve seat 40, between valve seat 40 and outlet opening 36. Ball 44 can be an elastomer, such as synthetic rubber or the like, to provide a fluid tight seal with seat 40 when engaged against seat 40. A spring element 46 is installed in second bore 32 against ball 44, between ball 44 and outlet opening 36. Tin coated music wire is a suitable material for spring element 46 in a vehicle fuel line system. Spring element 46 is an open structure through which fluid can flow along the fluid flow path defined by second bore 32, without substantial restriction.

A retainer 50 is provided in second bore 32 inwardly from outlet opening 36, and is fixed in position within bore 32. Retainer 50 is located between spring element 46 and outlet opening 36. Retainer 50 also can be an injection molded acetal copolymer body fixed in position by ultrasonic welding, suitable adhesive or other fixing means. Retainer 50 is a cylindrical body and defines an axial opening 52 therethrough through which fluid flows along second bore 32. Retainer 50 is spaced from valve seat 40 such that spring element 46 is thereby operationally captured between retainer 50 and ball 44 so as to urge ball 44 toward and against valve seat 40 in a sealing arrangement when the pressure conditions within regulator control valve 10 are below a prescribed opening pressure for pressure responsive valve 38.

Body 20 of regulator control valve 10 can be provided with outward protrusions or the like on the outer surfaces of first tube-like portion 22 and a second tube-like portion 24 to facilitate fluid tight engagement with fuel lines held thereon by clamps or the like (not shown). Accordingly, protruding rings 54, 56 can be provided on the outer surface of first tube-like portion 22 of body 20, at opposite ends of first tube-like portion 22, and one or more rib 58 can be provided on the distal segment of second tube-like portion 24 to engage a return line 60 leading from regulator control valve 10 to fuel tank 14. Protruding rings 54, 56 and rib 58 are only exemplary of configurations that can be used. Various other single-barb or multi-barb configurations also can be used as necessary or desirable for connecting to various types of tubes and hoses. Still other kinds of connections can be used such as, for example, quick connect couplings, threaded couplings and the like; and first tube-like portion 22 and a second tube-like portion 24 can be provided with a variety of different configurations for accommodating such couplings.

To stiffen and rigidify the T-shaped structure of body 20, an enlarged collar 62 can be provided at the junction of first tube-like portion 22 with a second tube-like portion 24. Further, gussets 64 and a flange 66 can be provided together with collar 62 for additional structural stiffening.

Regulator control valve 10 is installed in the fuel line of an engine such that bore 26 provides a direct, substantially unrestricted flow-through path for fuel, whether regulator control valve 10 is in an opened or closed condition. Open ends 28 and 30 are connected in line with the fuel line 18. Outlet opening 36 from second bore 32 is connected by tube or return line 60 to establish flow communication with the fuel tank 14 interior. At lower pressure conditions within bore 26, spring element 46 biases ball 44 against valve seat 40 to block fluid flow through second bore 32 from bore 26. At the established pressure condition in bore 26, the biasing resistance from spring element 46 is overcome, and ball 44 is moved away from valve seat 40, establishing flow communication between bore 26 and the length of bore 32 via valve seat 40. As long as a pressure condition exists sufficient to overcome the biasing force of spring element 46, fluid flows from bore 26 through valve seat 40 into bore 32 and via retainer opening 52 to fuel tank 14.

An advantage of the present invention is that regulator control valve 10 can be constructed for different types of installations and uses, to open and close at different pressure conditions, simply by changing spring element 46 as necessary to provide different load characteristics at the prescribed compression height of spring element 46. The remaining parts of regulator control valve 10 can remain the same, with a stronger, more resistant spring element 46 used when regulator control valve 10 is to be opened only at a higher pressure condition, and a weaker, less resistant spring element 46 used when regulator control valve 10 is to be opened at lower pressure conditions. Accordingly, fewer different parts are needed to assemble valves operable under different conditions. Body 20, valve seat 40, ball 44 and retainer 50 can remain the same, with only different spring elements 46 being required to assemble valves useful for different operating conditions.

It should be understood that the specification of materials herein, including acetal copolymer for body 20 and retainer 50, brass for valve seat 40 and tin coated music wire for spring element 46 are merely examples of suitable materials that can be used in a vehicle fuel system. Other suitable materials also can be used. Further, it is expected that the present invention will have applications and uses in systems other than fuel systems, and with fluids other than fuel for internal combustion engines. Accordingly, it is expected that other materials can be used for the various parts depending upon the installation conditions under which the valve will be used and the fluids to be passed therethrough.

The invention is not limited in its application to the details of construction and the arrangements of the components set forth in the above description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A pressure regulator and control valve comprising:
   a T-shaped body having a substantially uninterrupted, straight-line first bore therethrough from a first end opening thereof to a second end opening thereof;
   a second bore having an internal inlet in said body in flow communication with said first bore, and having an external outlet opening therefrom; and
   a pressure responsive ball valve in said second bore for opening and closing a fluid flow pathway from said first bore through said second bore.

2. The pressure regulator and control valve of claim 1, said pressure responsive ball valve comprising a valve seat in said second bore; a ball between said valve seat and said second bore external outlet opening; and a spring between said ball and said second bore external outlet opening.

3. The pressure regulator and control valve of claim 2, said ball being elastomeric and said valve seat being metal.

4. The pressure regulator and control valve of claim 2, including a cylindrical retainer in said second bore between said spring and said second bore external outlet opening.

5. The pressure regulator and control valve of claim 4, said ball being elastomeric and said valve seat being metal.

6. An in-line pressure regulator control valve comprising:
   a monolithic body defining a first bore and a second bore;
   said first bore having first and second outer openings in said body at opposite ends of said first bore and defining a substantially unrestricted fluid flow path through said body;
   said second bore having an inner end opening into said first bore between said first and second outer openings, and said second bore having a second end thereof defining a third outer opening in said body; and
   a pressure responsive valve disposed in said second bore having a closed position blocking flow through said second bore when a pressure of a fluid in said first bore is below a pre-established pressure, and an opened position allowing fluid flow through said second bore when a pressure of a fluid in said first bore is above said pre-established pressure.

7. The in-line pressure regulator control valve of claim 6, said pressure responsive valve including a valve seat in said second bore, a valve element operatively associated with said valve seat, and spring means biasing said valve element against said valve seat when said pressure is less than said pre-established pressure.

8. The in-line pressure regulator control valve of claim 7, including a spring in said second bore between said valve element and said third outer opening in said body.

9. The in-line pressure regulator control valve of claim 8, including a cylindrical retainer in said second bore between said spring and said third outer opening in said body.

10. The in-line pressure regulator control valve of claim 9, said valve element being an elastomeric ball.

11. A vehicle fuel system module comprising:
    a fuel tank;

a fuel pump delivering fuel from said fuel tank;

a fuel line from said fuel pump; and an in-line fuel pressure regulator and control valve in flowthrough installation in said fuel line, said fuel pressure regulator and control valve including:

a body defining first and second bores therein;

said first bore having an inlet and an outlet connected to said fuel line, and defining a flow through path in direct flow communication with said fuel line;

said second bore having an inlet in flow communication with said first bore between said inlet and said outlet of said first bore, said second bore having an outlet therefrom in flow communication with said fuel tank; and a pressure responsive valve disposed in said second bore for opening and closing a fluid flow path through said second bore.

12. The vehicle fuel system module of claim 11, said body being substantially T-shaped.

13. The vehicle fuel system module of claim 11, said pressure responsive valve including a valve seat in said second bore, a valve element operatively associated with said valve seat, and a spring means biasing said valve element against said valve seat when said pressure is less than said pre-established pressure.

14. The vehicle fuel system module of claim 13, said spring means comprising a spring in said second bore between said valve element and said outlet from said second bore.

15. The vehicle fuel system module of claim 14, further including a cylindrical retainer between said spring and said outlet from said second bore.

16. The vehicle fuel system module of claim 14, said valve element being an elastomeric ball.

17. The vehicle fuel system module of claim 11, further comprising:

said body being a monolithic body having a T-shape including first and second tube portions;

said first tube portion defining said first bore connected in line with said fuel line; and said second tube portion defining said second bore.

18. The vehicle fuel system module of claim 17, said pressure responsive valve comprising:

a valve seat insert molded in said second bore;

an elastomeric ball disposed in said second bore between said valve seat and said outlet from said second bore;

a spring disposed in said second bore between said elastomeric ball and said outlet from said second bore; and a cylindrical retainer ring in said second bore between said spring and said outlet from said second bore.

19. The vehicle fuel system module of claim 17, including a fuel return line connecting said second tube portion and said fuel tank in fluid flow communication.

20. The vehicle fuel system module of claim 19, said first and second tube portions having outward protrusions on outer surfaces thereof for engaging said fuel line and said return line.

* * * * *